United States Patent [19]

Fagerburg et al.

[11] 4,003,883
[45] Jan. 18, 1977

[54] POLYESTERETHER HAVING COMMERCIALLY ACCEPTABLE MOLD RELEASE CHARACTERISTICS

[75] Inventors: David R. Fagerburg; Burns Davis, both of Kingsport, Tenn.

[73] Assignee: Eastman Kodak Company, Rochester, N.Y.

[22] Filed: Oct. 28, 1975

[21] Appl. No.: 626,518

[52] U.S. Cl. .......................... 260/75 R; 260/40 R
[51] Int. Cl.² ...................................... C08G 63/12
[58] Field of Search ................................ 260/75 R

[56] References Cited

UNITED STATES PATENTS

| | | | |
|---|---|---|---|
| 2,901,466 | 8/1959 | Kibler et al. | 260/75 R |
| 3,023,192 | 2/1962 | Shivers | 260/75 R |
| 3,522,215 | 7/1970 | Sardessai et al. | 260/75 R |
| 3,832,314 | 8/1974 | Hoh et al. | 260/75 R X |

OTHER PUBLICATIONS

T881,007; 12001970; Meyer.

*Primary Examiner*—Lucille M. Phynes
*Attorney, Agent, or Firm*—D. B. Reece, III; C. R. Martin

[57] ABSTRACT

Disclosed is a polyesterether having a critical range of poly(alkylene oxide) glycol. Articles molded from this polyesterether exhibit unobvious mold release characteristics.

2 Claims, No Drawings

POLYESTERETHER HAVING COMMERCIALLY ACCEPTABLE MOLD RELEASE CHARACTERISTICS

This invention relates to a polyesterether that can be molded into articles which will release from the mold with commercially acceptable frequency.

The use of objects molded from synthetic polymers has expanded rapidly in the last several decades. In particular, polyesters have gained wide acceptance for molding objects requiring a wide variety of properties. Typically, polyesters have mechanical properties similar to those expected of synthetic plastics. Some polyesters have mechanical properties sufficiently high that objects molded from these polyesters can be substituted for objects formed from much stronger materials, such as ceramic and metallic materials. Other polyesters modified with large amounts of poly(alkylene oxide) glycols, sometimes called polyesterethers, have mechanical properties that are between the properties of rubbers and polyesters not modified with poly(alkylene oxide) glycols. Polyesterethers modified with amounts of poly(alkylene oxide) glycols ranging from quite small to fairly large are well known in the art and are described in U.S. Pat. Nos. 2,744,087, 3,023,192, 3,651,014, 3,766,146 and 3,763,109. The poly(alkylene oxide) glycol used to prepare the polyesterether is often called the "soft" glycol and the non-poly(alkylene oxide) glycol is often called the "hard" glycol. This terminology has developed because the use of major amounts of poly(alkylene oxide) glycols tends to produce polymers that are soft and somewhat rubberlike, and the use of major amounts of non-poly(alkylene oxide) glycols tends to produce polymers that are not soft and are like typical synthetic polymers.

Of the countless dicarboxylic acids and diols that can be used to prepare the polyester portion of the polyesterether, the polyester of terephthalic acid and 1,4-cyclohexanedimethanol exhibits a commercially acceptable balance of mechanical properties for typical thermoplastic molding applications. Although polyesters based on the use of terephthalic acid and 1,4-cyclohexanedimethanol exhibit a commercially acceptable balance of mechanical properties for typical applications, there is one problem that has hampered commercial acceptance of molding plastics based on this type of polyester. This problem is that articles molded from this type of polyester cannot be molded in a crystallized and hence dimensionally stable state and still release from the mold with commercially acceptable frequency when the mold temperature is low enough to be commercially acceptable. While mold temperatures of about 140° C. or greater can be used to mold articles of this type of polyester which exhibit commercially acceptable mold release, temperatures this hot are above the temperature of low pressure steam and are not commercially acceptable because of the expense of heating the mold. In order to be regarded as commercially acceptable, the mold temperature should be no greater than about 100° C. or preferably lower. In summary, articles molded from polyesters based on terephthalic acid and 1,4-cyclohexanedimethanol stick in the mold more than can be tolerated on a commercial scale when the mold temperature is low enough to be commercially acceptable.

Mold release is indeed a critical aspect of commercial acceptance of a molding plastic. To the commercial molder the interruption of molding operations due to an article not releasing from the mold is an almost unacceptable situation. For example, if an article which has been injection molded will not break from the mold, the molding operation must be stopped and the part manually removed, or, if the part has stuck too badly, the mold must be removed from the molding machine and another similar mold installed before additional molding can be accomplished. The mold containing the article that has stuck badly must be then cleaned thoroughly before the mold can be used further. Clearly, interruptions of this nature are acceptable only if reduced to a bare minimum.

Accordingly, the basic object of this invention is to provide a polyesterether that has commercially acceptable mold release characteristics.

Broadly this invention is a polyesterether of terephthalic acid, 1,4-cyclohexanedimethanol, tetramethylene glycol, and an amount of poly(alkylene oxide) glycol within a critical range.

The most pertinent prior art applicants are aware of is U.S. Pat. No. 3,023,192. Other prior art that applicants are aware of includes U.S. Pat. No. 2,901,466, 3,013,914, 3,261,812, 3,033,822, 3,243,413, 3,651,041, 3,763,109, 3,776,146, 3,784,520.

As will be appreciated from a consideration of this prior art, polyesterethers in general are well known. Additionally, polyesterethers of terephthalic acid, an organic diol, tetramethylene glycol and a poly(alkylene oxide) glycol are also well known in the art and are disclosed in U.S. Pat. No. 3,023,192.

The polyesterether of this invention is thought to be patentable because the polyesterether of this invention is novel over the disclosure of U.S. Pat. No. 3,023,192 because the mold release characteristics of the polyesterether of this invention are unobvious over the prior art in general.

The polyesterether of this invention is thought to be novel over the disclosure of U.S. Pat. No. 3,023,192 because Shivers does not specifically disclose that the organic diol can be 1,4-cyclohexanedimethanol or does not disclose the specific ranges of 1,4-cyclohexanedimethanol and tetramethylene glycol useful in applicants' invention.

The polyesterether of this invention is thought to be unobvious over U.S. Pat. No. 3,023,192, as well as the remaining prior art, because only when the amount of poly(alkylene oxide) glycol is within the critical range of 10–50 weight percent do articles release from the mold in a commercially acceptable manner.

The polyesterether of this invention can be described as comprised of

A. a dicarboxylic acid component comprised of terephthalic acid, and

B. a diol component comprised of
  1. a glycol comprised of 90–60 mole percent 1,4-cyclohexanedimethanol and 10–40 mole percent tetramethylene glycol, and
  2. 10–50 weight percent, based on the weight of the polyesterether, of a poly(alkylene oxide) glycol having 2 to 4 carbon atoms in the repeating unit and having a molecular weight in the range of 400 to 2,000.

In a preferred embodiment, the 1,4-cyclohexanedimethanol is 80–65 mole percent, the tetramethylene glycol is 20–35 mole percent, and the poly(alkylene oxide) glycol is 20–40 weight percent poly(tetramethylene oxide) glycol.

As reported earlier, the dicarboxylic acid component of the polyesterether is comprised of terephthalic acid. Minor amounts of other aliphatic and aromatic dicarboxylic acids having a molecular weight of less than 300 can be used in conjunction with the terephthalic acid as long as the unobvious mold release character of the polyesterether is preserved. Examples of aliphatic dicarboxylic acids which can be used in conjunction with terephthalic acid are sebacic acid, 1,3-cyclohexanedicarboxylic acid, 1,4-cyclohexanedicarboxylic acid, adipic acid, pimelic acid, suberic acid, glutaric acid, succinic acid, carbonic acid, oxalic acid and azelaic acid. Examples of aromatic dicarboxylic acids which can be used in conjunction with terephthalic acid are isophthalic acid, dibenzoic acid, substituted dicarboxy compounds with two benzene nuclei such as bis(p-carboxylphenyl)methane, 4,4'-oxydibenzoic acid, ethylene-bis(p-oxybenzoic acid), 1,5-naphthalene dicarboxylic acid, 2,6-naphthalene dicarboxylic acid, 2,7-naphthalene dicarboxylic acid and 4,4'-sulfonyl dibenzoic acid.

The term "dicarboxylic acids", as used herein, includes equivalents of dicarboxylic acids having two functional carboxyl groups which perform substantially like dicarboxylic acids in reaction with glycols and diols in forming copolyester polymers. For example, the term "dicarboxylic acids" include the bis alkyl ester, such as dimethyl terephthalate.

As disclosed previously, the hard glycol useful in the polyesterether of this invention is a mixture of 1,4-cyclohexanedimethanol and tetramethylene glycol within a specific range. Minor amounts of other glycols can be used in conjunction with the mixture of 1,4-cyclohexanedimethanol and tetramethylene glycol as long as the unobvious mold release character of the polyesterether is preserved. While broadly the glycol that can be used in conjunction with the 1,4-cyclohexanedimethanol and tetramethylene glycol can be an aliphatic glycol having a molecular weight of less than 300, in a preferred embodiment, the glycol can be an aliphatic glycol having up to 12 carbon atoms. Examples of suitable glycols are propylene, ethylene, pentamethylene, 2,2-dimethyltrimethylene, hexamethylene, and decamethylene glycols.

As broadly described above, the soft glycol useful in this invention is a poly(alkylene oxide) glycol having 2 to 4 carbon atoms in the repeating unit and having a molecular weight in the range of 400–2,000. Examples of poly(alkylene oxide) glycols that can be used include poly(ethylene oxide) glycol, poly(propylene oxide) glycol and poly(tetramethylene oxide) glycol. Copoly(alkylene oxide) glycols, such as poly(ethylene/propylene oxide) glycol, can be used. In a preferred embodiment, the poly(alkylene oxide) glycol can be poly(tetramethylene oxide) glycol. Glycols of the type useful in this invention are well known in the art.

The polyesterethers of this invention herein can be prepared in accordance with the disclosure of U.S. Pat. Nos. 3,023,192, 3,013,914 and 3,763,109.

In this invention the polyetherester has an inherent viscosity of at least 0.4 and preferably 0.6, or even higher.

The polyesterether of this invention can be molded into useful articles by molding techniques well known in the art, such as injection molding.

Although the polyesterethers of this invention possess many desirable properties, it is advisable to stabilize certain of the compositions to heat or radiation by ultraviolet light. This can be done by incorporating into the polyesterether stabilizers well known in the art.

The properties of the polyesterether of the invention can be modified by incorporation of various conventional additives such as pigments, inorganic fillers such as carbon black, silica gel, alumina, titanium dioxide, clays, chopped fiber glass, and flame retardants. Although the polyesterether can be modified with various materials, the materials and the amounts of the materials must be selected so as to preserve the unobvious mold release character of the polyesterether of this invention.

The polyesterether of this invention has a commercially acceptable balance of properties. Articles molded from many of the compositions of the invention exhibit low warpage, acceptable surface finish, good paintability with typical paint systems, absence of surface sink marks and increased recovery in compression. This balance of properties makes the polyesterether of the invention particularly suitable for molding into articles used on automobile exteriors and similar applications.

In this patent application the term "commercially acceptable mold release characteristics", and words of similar import means, that ASTM D638-72 Type 1 test bars are ejected by the knock out pins of the mold greater than 90 percent of the time when the polyetherester of this invention is injection molded using a New Britain reciprocating screw injection molding machine operated with a back pressure of 100 psi, and a barrel temperature and a mold temperature selected to reflect the amount of poly(alkylene oxide) glycol used to prepare the polyesterether. In a preferred embodiment, the test bars are ejected greater than 95 percent of the time. The mold temperature must be selected to reflect the amount of poly(alkylene oxide) glycol because the highest frequency of mold release for a polyesterether prepared using a specific amount of poly(alkylene oxide) glycol typically occurs only within a specific mold temperature range. For example, a polyesterether of the invention prepared from 70 mole percent 1,4-cyclohexanedimethanol, 30 mole percent tetramethylene glycol and 30 weight percent poly(tetramethylene oxide) glycol exhibits commercially acceptable mold release within a mold temperature range of 60° to 100° C. A similar polyesterether containing 40 weight percent poly(tetramethylene oxide) glycol exhibits commercially acceptable mold release within a mold temperature range of 50° to 100° C. In general, when a greater amount of poly(alkylene oxide) glycol is used, a lower mold temperature can be used to produce commercially acceptable mold release characteristics. The barrel temperature must also be selected to reflect the amount of poly(alkylene oxide) glycol used to prepare the polyesterether because of the change in polymer melting point with change in amount of poly(alkylene oxide) glycol. For example, a typical barrel temperature would be 270° C. when molding a polyesterether of the invention prepared from 80 mole percent 1,4-cyclohexanedimethanol, 20 mole percent tetramethylene glycol and 25 weight percent poly(tetramethylene oxide) glycol. When the amount of poly(tetramethylene oxide) glycol is 40 weight percent a typical barrel temperature would be 240° C.

In this disclosure, the inherent viscosity of the polymer is measured at about 25° C. using 0.5 percent of the polymer in a solvent composed of 60 percent by weight of phenol and 40 percent by weight of tetrachloroethane.

EXAMPLE 1

This example illustrates preparation of the polyesterether of this invention and the unobvious mold release character obtained from the polyesterether of this invention containing a critical range of 10-50 weight percent poly(alkylene oxide) glycol.

A poly(1,4-cyclohexylenedimethylene terephthalate) is prepared with 70 mole percent 1,4-cyclohexanedimethanol, 30 mole percent tetramethylene glycol and 30 weight percent poly(tetramethylene glycol) having a molecular weight of 1000. The following are combined in a 500-ml round bottom flask fitted with a stirrer and a head for blanketing the reaction mixture with nitrogen while removing volatile products during the course of the reaction: 78 g. (0.402 mol) of dimethyl terephthalate, 45.8 g. (0.046 mol) of 1000 mol wt poly(tetramethylene glycol), 73.2 g (0.356 mol) of a 70% solution in methanol of 1,4-cyclohexanedimethanol, 15 g (0.167 mol) tetramethylene glycol, 0.15 g of Irganox 1010, and 200 ppm Ti metal as titanium tetraisopropoxide. The flask is immersed with stirring in a 200° C. metal bath and held there for 30 min. after which the temperature was raised to 225° C., held there for 20 min., and raised to 265° C. Polycondensation is carried out at this bath temperature and a pressure of 0.1 torr for 2 hr. after which the flask is repressurized with nitrogen and the polymer allowed to cool. The polymer has an inherent viscosity of 1.35.

Other similar polyesterethers containing 0, 5, 10, 15, 20 25, 35, 45, 50, 55, 60, 65 and 70 weight percent poly(tetramethylene oxide) glycol are similarly prepared. Polyesterethers containing above about 70 weight percent poly(tetramethylene oxide) glycol have low melting points and tend to be largely amorphous.

Each of these polyesterethers is used to mold ASTM D638-72 Type 1 test bars into a 50° to 100° C. mold using a New Britain injection molding machine operated with a back pressure of 100 psi and a barrel temperature chosen to reflect the amount of poly(alkylene oxide) glycol present.

In all these runs enough moldings are taken to achieve steady state operating conditions and enough moldings are taken after achieving steady state conditions to insure a statistically valid quantitative expression of the percent of time the knock out pins break the test bar from the mold. Those polyesterethers which can be molded into test bars that break from the mold greater than 90 percent of the time are rated as having a commercially acceptable mold release character and those polyesterethers which cannot be molded into test bars that break from the mold greater than 90 percent of the time are rated as having a commercially unacceptable mold release character.

The below table presents data showing the amount of poly(alkylene oxide) glycol in the polyesterether and whether the polyesterether exhibits a commercially acceptable or unacceptable mold realease character.

| Run-No. | Weight Percent Poly(tetramethylene oxide) glycol | Commercially Unacceptable Mold Release | Commercially Acceptable Mold Release |
|---|---|---|---|
| 1 | 0 | X | |
| 2 | 5 | X | |
| 3 | 10 | | X |
| 4 | 15 | | X |
| 5 | 20 | | X |
| 6 | 25 | | X |
| 7 | 30 | | X |
| 8 | 35 | | X |
| 9 | 40 | | X |
| 10 | 45 | | X |
| 11 | 50 | | X |
| 12 | 55 | X | |
| 13 | 60 | X | |
| 14 | 65 | X | |
| 15 | 70 | X | |

These data illustrate that only when the amount of poly(alkylene oxide) glycol is within the range of 10–50 weight percent does the polyesterether exhibit a commercially acceptable mold release character. When the amount of poly(alkylene oxide) glycol is 5 weight percent or below, or 55 weight percent or above, the mold release character of the polyesterether is commercially unacceptable.

The polyesterether of this invention has been described in detail with particular reference to preferred embodiments thereof, but it will be understood that variations and modifications can be effected as long as the commercially acceptable mold release character of the polyesterether is preserved.

We claim:

1. A composition comprising a polyesterether having an inherent viscosity of at least 0.4., comprised of
   A. a dicarboxylic acid component comprised of terephthalic acid, and
   B. a diol component comprised of
      1. a glycol comprised of 90-60 mole percent 1,4-cyclohexanedimethanol and 10-40 mole percent tetramethylene glycol, and
      2. 10–50 weight percent, based on the weight of the polyesterether, of a poly(alkylene oxide) glycol having 2 to 4 carbon atoms in the repeating unit and having a molecular weight in the range of 400 to 2,000.

2. A composition comprising a polyesterether having an inherent viscosity of at least 0.4 comprised of
   A. a dicarboxylic acid component comprised of terephthalic acid,
   B. a diol component comprised of
      1. a glycol comprised of 80–65 mole percent 1,4-cyclohexanedimethanol and 20–35 mole percent tetramethylene glycol, and
      2. 20–40 weight percent, based on the weight of the polyesterether, of poly(tetramethylene oxide) glycol having a molecular weight in the range of 400 to 2,000.

* * * * *